United States Patent [19]

Timin

[11] 4,065,097
[45] Dec. 27, 1977

[54] SLOT SEALING VALVE FOR VACUUM COATING APPARATUS

[75] Inventor: Mitchell E. Timin, Berkeley, Calif.
[73] Assignee: Airco, Inc., Montvale, N.J.
[21] Appl. No.: 686,851
[22] Filed: May 17, 1976
[51] Int. Cl.² .............................................. F16K 13/00
[52] U.S. Cl. ................................................... 251/228
[58] Field of Search ................................... 251/58, 228

[56] References Cited

U.S. PATENT DOCUMENTS

| 24,369 | 6/1859 | Bramwell | 251/228 |
|---|---|---|---|
| 167,751 | 9/1875 | Earle | 251/228 |
| 612,627 | 10/1898 | Hirt | 251/58 |
| 3,334,858 | 8/1967 | Hay | 251/228 X |

*Primary Examiner*—Robert G. Nilson
*Attorney, Agent, or Firm*—David A. Draegert; Edmund W. Bopp

[57] ABSTRACT

An elongated gate-type valve is pivotally mounted within vacuum coating apparatus of the multiple-chamber, in-line type, and is operated to vacuum seal an access slot interconnecting vacuum chambers. An actuator for opening and closing the slot valve is connected through transversely spaced thrust links, the actuator ends of which have guide wheels, respectively, that are movable within restraining guide channels for confining the actuator ends to linear, vertical movement. An increasingly large closing and sealing force is applied to the valve, especially during final closure thereof, due to an increasing mechanical advantage of the actuator and thrust link arrangement for valve closing.

8 Claims, 4 Drawing Figures

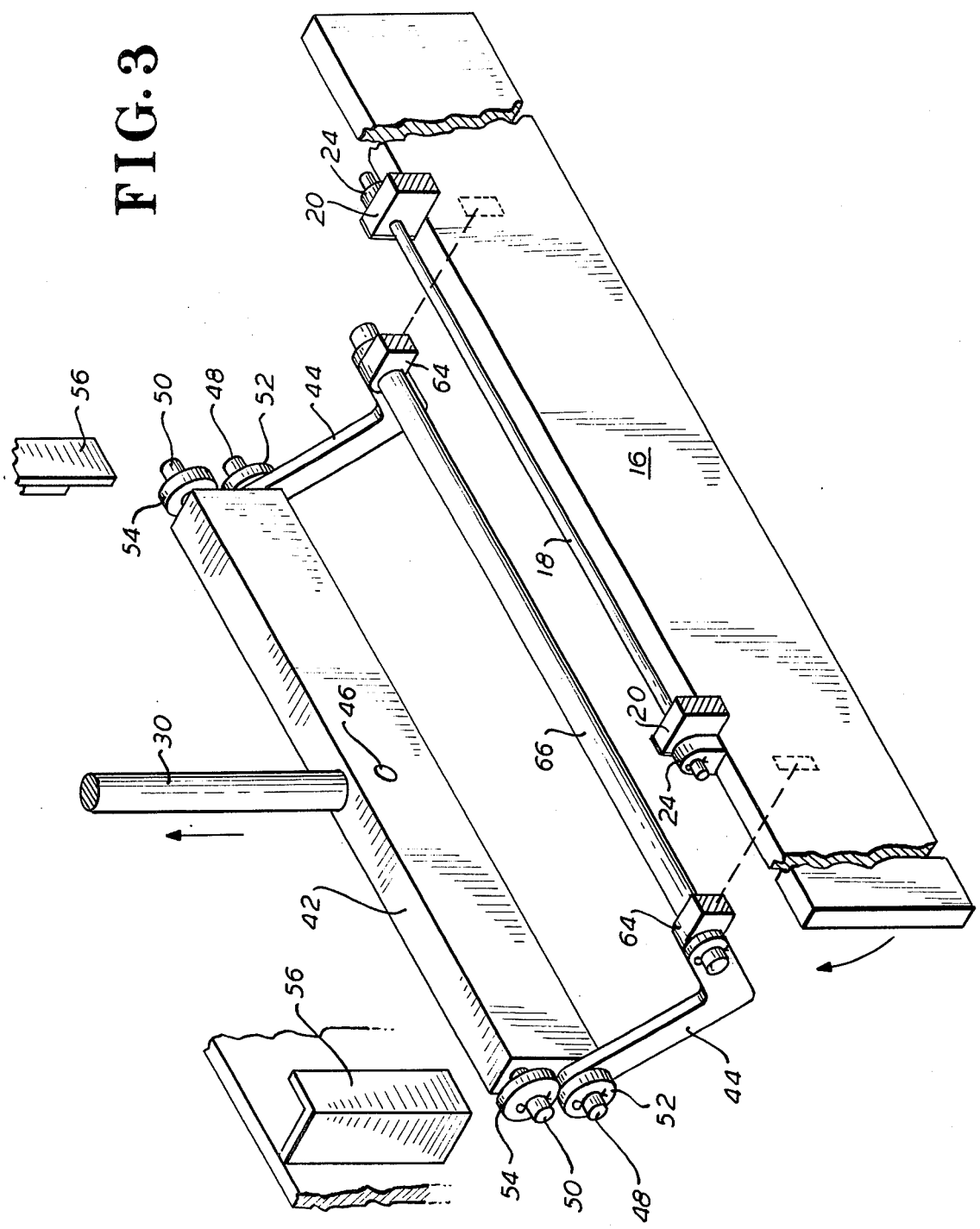

SLOT SEALING VALVE FOR VACUUM COATING APPARATUS

BACKGROUND OF THE INVENTION

Operating arrangements for closing vacuum chamber access slot sealing valves in vacuum coating apparatus of the multiple-chamber, in-line type, for example, have heretofore involved certain disadvantages including complexity and resultant higher initial costs, comparatively high power rating (and size) of the valve actuator or motive means required for proper valve sealing pressure, and, in the case of the so-called "flapper valve", where the valve member is carried bodily in floating manner on the actuating linkage itself, unsatisfactory slot sealing in the absence of high actuator power.

The present invention is particularly concerned with a materially simplified and comparatively inexpensive valve operating arrangement for improved access slot sealing in vacuum equipment of the character described above.

SUMMARY OF THE INVENTION

In accordance with the invention, the access slot sealing valve mentioned above is of the gate-type, and is hung above the access slot on a fixed housing wall of the vacuum apparatus. An actuator of suitable type having a reciprocally movable actuating rod is connected to the slot valve through transversely spaced links that directly act as thrust members. The actuator ends of the thrust links, respectively, are restrained for linear, preferably vertical, movement, by low-friction rollers or wheels movable within fixed, linear guide channels, and the valve ends of the links are directly connected to transversely spaced midportions respectively, of the valve. The length of the thrust link, the actuator linear travel, and the corresponding pivotal movement of the valve are geometrically related so that the ratio of the applied thrust at the valve to the actual actuator force for corresponding increments of travel, increases materially during valve closing, especially during the final closing and sealing thrust.

A principal object of the invention, therefore, is an improved valve operating arrangement for a vacuum chamber access slot sealing valve, that is comparatively simple and inexpensive in construction, that operates directly and efficiently to seal a gate-type access slot valve in vacuum apparatus of the type described, and that is adapted to apply to the valve during closure sealing a comparatively high thrust (in relation to the actual power rating of the actuator), that progressively increases during valve closure.

Other features, objects, and advantages will appear from the following description with reference to the accompanying drawings.

BRIEF DESCRIPTION OF DRAWINGS

FIG. 3 is a perspective view showing details of the valve operating means of FIGS. 1 and 2.

DESCRIPTION OF PREFERRED EMBODIMENT OF THE INVENTION

Figure 1:
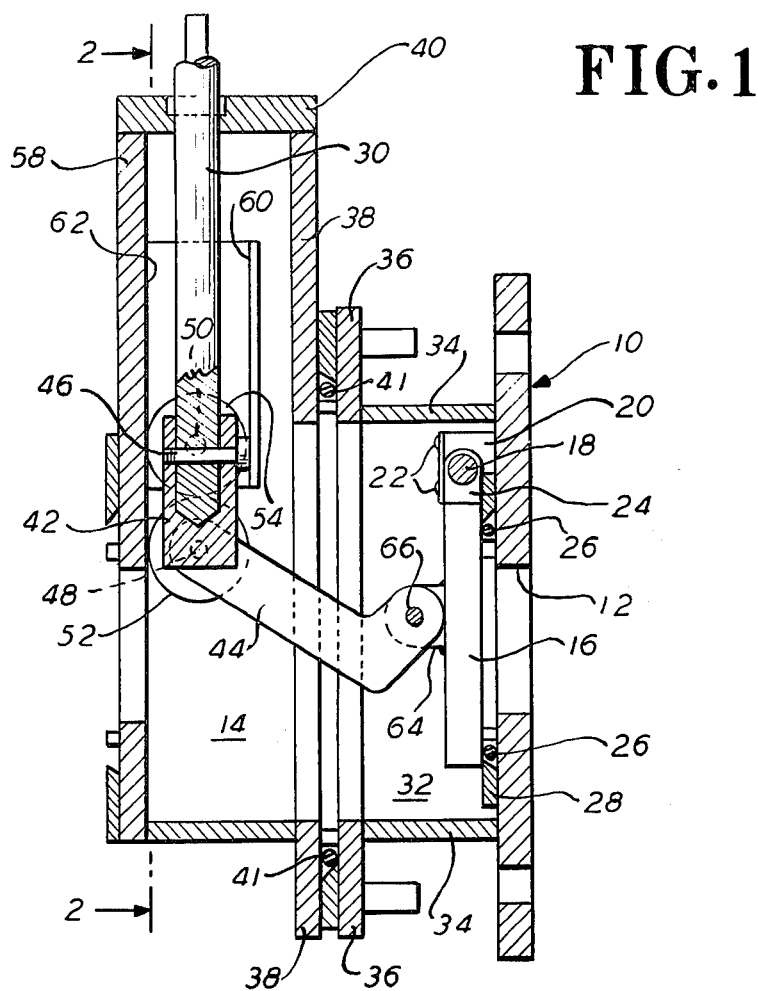
FIG. 1 is a side view in elevation, partly in section, of vacuum chamber wall structure with access slot having vacuum sealing valve means embodying the invention, in the closed and slot-sealing position thereof.
Figure 2:
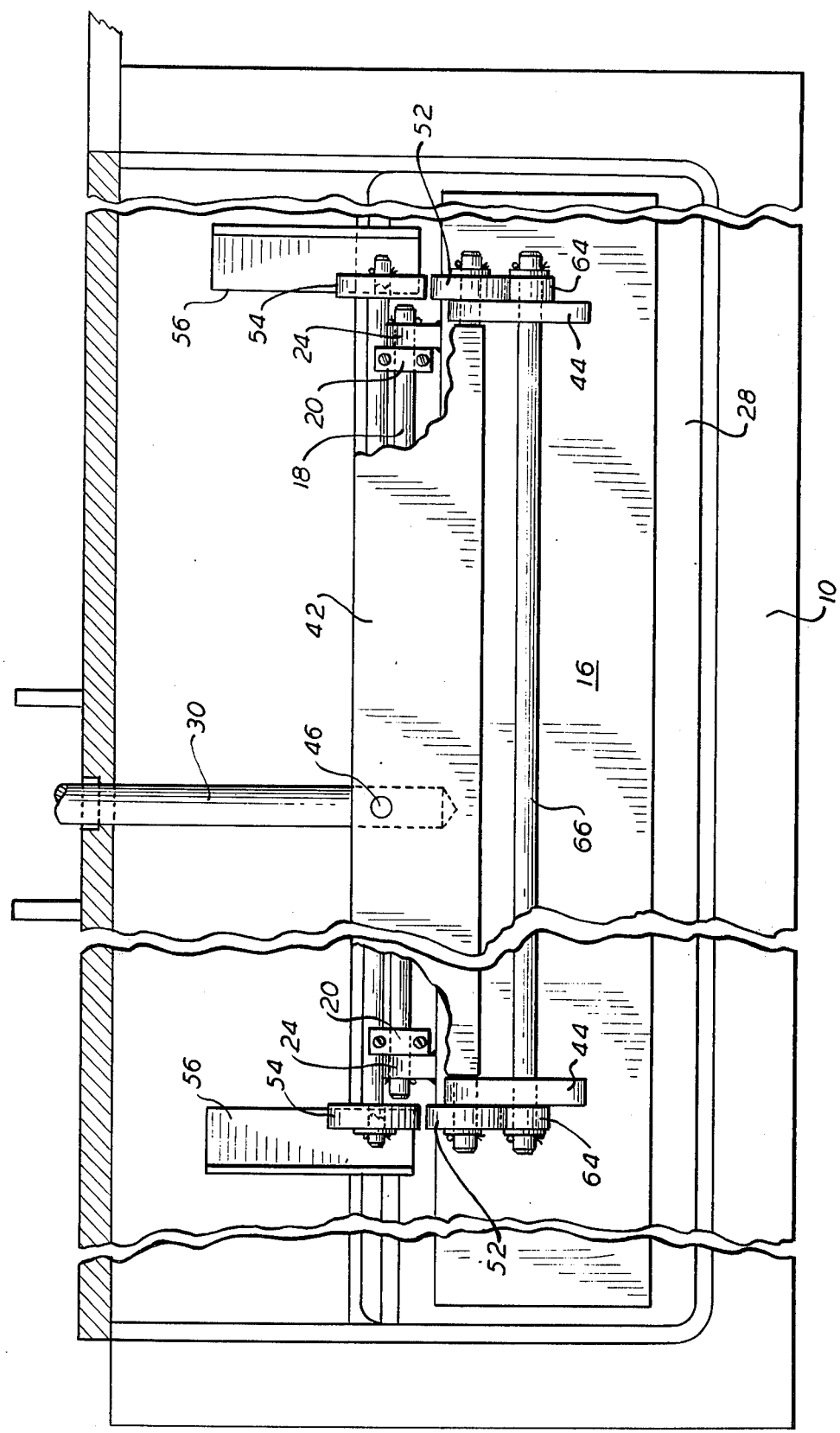
FIG. 2 is a frontal view of the valve means and related chamber housing wall taken generally along the line 2—2 of FIG. 1.

Referring to FIG. 1, a vacuum coating chamber is generally represented by an entrance wall 10 of the chamber housing. An elongated access slot 12, FIGS. 1 and 2, is formed in the chamber wall 10, through which a conventional substrate carrier (not shown) may be moved from a chamber 14 for positioning the substrates within a vacuum coating chamber in known manner. Where the coating is by deposition, a comparatively high vacuum is maintained in the coating chamber; on the other hand, where the "sputtering" process is used, the coating chamber pressure is somewhat higher than that in the antechamber 14.

In vacuum coating apparatus of the type herein represented, a plurality of vacuum chambers, load locks, and the like, are connected as units serially in line, the individual units being preferably of modular construction for facilitating interconnection and flexibility of assembly. Passage of the substrate carrier between the chambers, locks, etc., is through partition or wall slots such as the access slot 12, that, when connecting with a load lock, for example, requires a vacuum sealing valve. Such sealing valves are also required at the entrance and exit slots respectively, of the two end load locks that lead to atmosphere. Since the slot sealing valves are essentially similar in construction, a description of the valve means for slot 12 will be sufficient for an understanding of the invention.

The access slot 12 interconnecting the vacuum coating chamber and a load lock or buffer chamber 14, for example, is adapted to be vacuum-sealed according to the invention by a gate-type valve 16 comprising an elongated metal plate that is pivotally hung on the upper side of the chamber wall 10. The valve pivot comprises an elongated axle rod 18 that is journalled at each end, FIG. 2, in a retainer or bearing 20. Each retainer is secured by screws or bolts 22 to the wall 10 and each end of the axle rod overhangs the corresponding retainer 20 and has freely pivotted thereon a tab or lug 24 that, in turn may be secured as by welding to the upper edge of the metal valve plate. Thus, the slot valve plate is supported at two spaced points (at least) for pivotal, gate-like movement and, when actuated as described below, it can be pivotted about the axle 18 outwardly (clockwise, as viewed) within the chamber 14 through an angle of approximately 90° to its fully open position. This position provides for adequate clearance above the slot 12 for movement of the substrate carrier therethrough.

For sealing the slot valve in the closed position shown in FIG. 1, an O-ring 26 is suitably mounted within a generally rectangular frame 28 that is joined to the chamber wall 10 so as peripherally to surround the slot 12. The slot valve when closed is urged into sealing engagement with the O-ring by the valve actuating means.

The actuating means for the slot valve comprises an actuator piston rod 30 or the like, that is mounted for reciprocal movement in the example shown, and extends from above and into the chamber 14. The chamber 14 which is of modular type as mentioned above, is coupled in sealed relation to the vacuum chamber wall 10 through an adapter vestibule 32 or the like. The vestibule housing which encloses the slot valve comprises an open-end box-like body portion 34 that is connected to the wall 10 at one end and has peripheral securing flanges 36 at its opposite open end. These flanges are suitably coupled to corresponding peripheral flanges 38 on the adjoining open end housing 40. An O-ring 41 makes a peripheral vacuum seal between the housing flanges 36 and 38. In a practical arrangement, the actuator unit can be incorporated in a module that can be readily coupled as indicated to related inline units.

The actuator rod 30, referring first to FIG. 1, is connected to the slot valve 16 through a cross-bar 42 and at least two transversely spaced links 44, that function on the actuator downstroke as thrust members for closing and sealing the valve, and on the upstroke to lift outwardly and pivot the valve upward to its open position. As represented in FIG. 2, the actuator rod is connected to the mid-portion of the crossbar 42 by a throughbolt 46, and the opposite ends of the crossbar are connected respectively through similar links 44 to the slot valve. The crossbar 42 which is shown in detail by FIG. 3 has two vertically spaced pins or stud shafts 48 and 50 extending longitudinally from each end of the bar, the lower pin 48 constituting a pivotal connection, FIGS. 2 and 3, for the corresponding thrust member or link 44. As shown herein, the thrust link 44 is of "dog-leg" configuration in order to avoid interference with the upper housing wall structure during valve opening.

For insuring precise linear travel of the actuator rod and crossbar during reciprocal movement thereof, and for avoiding friction galls incident to sliding metal-to-metal surfaces within a vacuum, there is connected at each end of the crossbar to each of the pins 48 and 50 a roller or wheel (52 and 54, respectively), arranged to bear on and to be restrained within a vertical channel-shaped guide 56 that is fixed to the housing end wall 58. As best shown in FIG. 3, the lower pin 48 in addition to functioning as the thrust pivot for link 44, also carries the wheel 52 that is arranged to bear on and be guided between the vertical guide surfaces 60 and 62 formed by the guide channel, following a short initial upward movement of the actuator. The upper wheel 54 on the other hand, is within the guide, FIG. 1, in the closed-valve position and remains in contact with the guide surfaces until near the end of the upward or opening stroke. Accordingly, at least one of the wheels is within the vertical guide at all times; hence the crossbar itself is restrained at each end for vertical movement along the respective end-guide 56, and the actuating or thrust pivot 48 connected to each link 44 necessarily moves along a vertical linear path.

The opposite end of each thrust link connected to the slot valve has a pivotal connection with a tab or lug 64 that is fixed to a mid-portion of the slot valve at opposite ends respectively, thereof. The link-valve pivot comprises an elongated rod 66 that extends through the lug 64, across the length of the elongated valve to a similar lug and link connection at the opposite end of the valve, as indicated by FIGS. 2 and 3. Thus, upon closure of the valve, the actuator thrust force is, as described below, transmitted by the links 44 substantially uniformly to the valve to make a tight peripheral seal at the O-ring 26, especially along both the long upper and lower edges of the valve.

Figure 4:
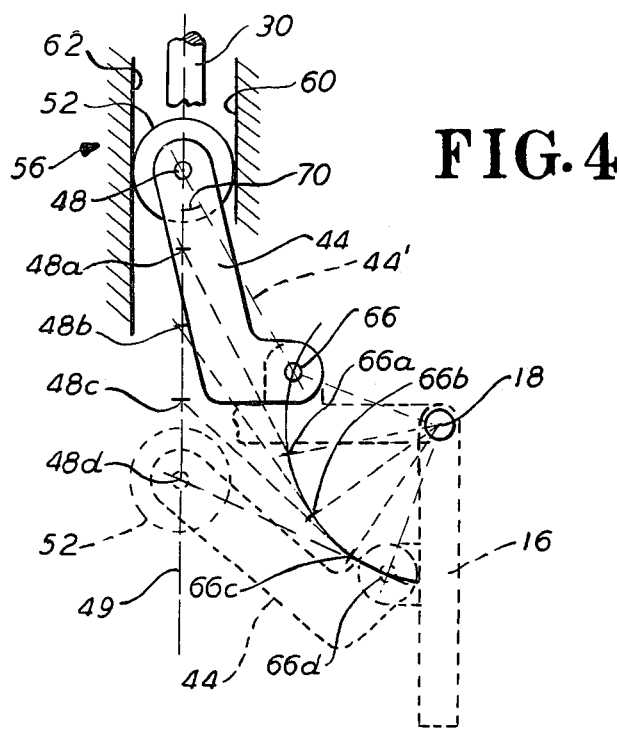
FIG. 4 is a partly diagrammatic view corresponding to FIG. 1 representing actuator thrust on the vacuum valve during the valve closing operation.

The mechanics of the improved vacuum valve operating means is diagrammatically illustrated by FIG. 4 wherein the slot valve 16 is represented as in its fully open position with the actuator rod (represented by the crossbar pivot shaft 48) in its upper position. The actuator rod 30 is connected to suitable electrical, pneumatic, or other type motive means.

Assuming now that the slot valve is in the open position, FIG. 4, and that the chamber slot 12 is to be closed and sealed, the actuator is energized to lower the rod 30 and crossbar 42. The respective thrust links 44 connected to opposite ends of the crossbar through the stub shafts 48 accordingly transmit thrust represented by the thrust lines 44' in the respective directions shown in FIG. 4 to the valve 16. In the initial or fully open position shown, the line-of-thrust makes an acute angle 70 with the actuator line of motion, i.e., path 49. As the shaft 48 of the guided wheel 52 moves vertically downward along the path 49, this angle increases progressively as represented by the corresponding thrust lines that extend from equally spaced shaft positions 48, 48a, 48b, etc., on the vertical path 49, to the valve 16.

The mechanical advantage of the actuator and guided link arrangement during valve closure is apparent by comparison of the linear positions 48a, 48b, etc., of the wheel shaft 48 and the corresponding arcuate positions 66, 66a, 66b, etc., of the pivot 66 that connects the thrust link 44 to the slot valve. The line-of-thrust is seen to approach an angle of 90° with respect to the linear path 49, i.e. the vertical as viewed, so that as the actuator rod descends, and especially as the valve approaches its closed position (point 66d), the ratio of actuator rod travel to corresponding arcuate travel of the valve at the connection 66 materially increases, until it reaches a value several times unity during final travel between the intermediate position 48c and the closed position 48d. The large thrust results in a tight and efficient vacuum seal between the slot valve and O-ring seal 26, and, for a given power rating of the actuator, this sealing force materially exceeds that of prior types of vacuum sealing valve arrangements known to applicant.

A further advantage of the invention is that the final closing thrust is for all practical purposes normal to the plate or seat 28 in which the sealing O-ring 26 is positioned. Thus, there is no relative lateral movement between the valve and O-ring, and harmful "scuffing" of the sealing ring is precluded.

The advantages of the invention are thus seen to comprise a less expensive and more compact actuator for a given valve-sealing duty, positive and efficient sealing of the vacuum chamber access slot by a simple gate-type valve, and elimination of multiple thrust-transmitting linkages that also tend to increase apparatus and maintenance costs.

Having set forth the invention in what is considered to be the best embodiment thereof, it will be understood that changes may be made in the system and apparatus as above set forth without departing from the spirit of the invention or exceeding the scope thereof as defined in the following claims.

What is claimed is:

1. In equipment for vacuum coating substrates including a vacuum chamber having an access opening in a wall thereof through which a substrate can be moved, an apparatus comprising: a sealing valve for said opening pivotally mounted to open for substrate clearance and to close for making a vacuum-tight seal, means for actuating the valve, guide roller means pivotally mounted on the valve actuating means, fixed guide means for guiding the roller means for reciprocal movement along a linear path, and a thrust member mounted co-pivotally with the roller means for interconnecting the actuating means and the valve defining a line-of-thrust therebetween, the acute angle between the line-of-thrust and the line of motion of the actuating means increasing toward 90° as the valve approaches its closed position, whereby the ratio of linear travel of the actuating end of the thrust member to the arcuate travel of the valve-connected end thereof increases materially during the final closing and valve-sealing movement of the thrust member.

2. Apparatus as specified in claim 1 wherein the access opening is an elongated slot and the valve is of gate-type that is pivotally supported along a longitudinal edge of the slot.

3. Apparatus as specified in claim 2 wherein at least two thrust members interconnect the linearly guided actuating means and the gate valve at transversely spaced points, respectively.

4. Apparatus as specified in claim 3 wherein the actuating means comprises an actuator rod and a crossbar at opposite ends of which the transversely spaced thrust members, respectively, are connected for operating the gate valve.

5. Apparatus as specified in claim 2 wherein the linear travel of the actuating means is substantially parallel to the plane defined by the access slot opening.

6. Apparatus as specified in claim 5 wherein the thrust member, during travel of the actuating means toward the closed valve position, is moved progressively toward a position substantially transverse to the slot opening plane.

7. Apparatus as specified in claim 5 wherein the crossbar has at each end thereof a pair of spaced stud shafts extending longitudinally from the bar and a guide roller mounted on each shaft, the rollers being restrained for linear travel within fixed guide means, and one of the rollers at each end of the crossbar having a co-pivotal connection with the corresponding thrust member.

8. Apparatus as specified in claim 1 wherein the fixed guide means comprises a channel-shape member, and the guide roller means comprises at least two rollers that are restrained for linear travel within the channel member, and one of the rollers has copivotal connection with the thrust member.

* * * * *